United States Patent
Kiten et al.

(10) Patent No.: US 10,012,302 B2
(45) Date of Patent: Jul. 3, 2018

(54) VEHICLE DIFFERENTIAL

(71) Applicant: TOYOTA JIDOSHA KABUSHIKI KAISHA, Toyota-shi, Aichi-ken (JP)

(72) Inventors: Takashi Kiten, Nissin (JP); Norihiro Mizoguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 109 days.

(21) Appl. No.: 15/220,831

(22) Filed: Jul. 27, 2016

(65) Prior Publication Data

US 2017/0037950 A1 Feb. 9, 2017

(30) Foreign Application Priority Data

Aug. 7, 2015 (JP) .................................. 2015-157740

(51) Int. Cl.
  *F16H 48/38* (2012.01)
  *F16H 48/40* (2012.01)
  *F16H 48/08* (2006.01)

(52) U.S. Cl.
  CPC .............. *F16H 48/40* (2013.01); *F16H 48/08* (2013.01); *F16H 48/38* (2013.01); *F16H 2048/385* (2013.01)

(58) Field of Classification Search
  CPC ............................................... F16H 2048/385
  See application file for complete search history.

(56) References Cited

U.S. PATENT DOCUMENTS

| 6,743,138 B2 * | 6/2004 | Krzesicki .............. F16H 57/037 475/230 |
| 2011/0263374 A1 * | 10/2011 | Cripsey .................. F16H 48/08 475/220 |
| 2013/0165290 A1 | 6/2013 | Groebel |
| 2013/0269462 A1 * | 10/2013 | Taniguchi ............... F16H 48/38 74/434 |
| 2014/0179482 A1 * | 6/2014 | Uchida .................. F16H 48/38 475/220 |

FOREIGN PATENT DOCUMENTS

| DE | 10163044 A1 | 6/2003 |
| DE | 102011101165 A1 | 11/2012 |
| JP | 2011-047420 A | 3/2011 |
| JP | 2011-106504 A | 6/2011 |
| JP | 2012-149692 A | 8/2012 |
| JP | 2013-537287 A | 9/2013 |

* cited by examiner

Primary Examiner — Tisha D Lewis
(74) Attorney, Agent, or Firm — Oliff PLC

(57) ABSTRACT

A vehicle differential includes a pair of side gears, a pinion gear, a differential case, and an annular ring gear. The differential case includes an opening penetrating a peripheral wall of the differential case. The annular ring gear is attached to an outer side of the peripheral wall of the differential case such that a central axis of the annular ring gear and a rotational axis of the differential case coincide with each other. The annular ring gear includes a protrusion on an inner peripheral edge of the annular ring gear. The protrusion covers a part of the opening when viewed in a penetration direction of the opening. The protrusion protrudes toward the inner side of the opening in the radial direction of the rotational axis as compared with an other part of the inner peripheral edge of the annular ring gear that has no protrusion.

5 Claims, 10 Drawing Sheets

VEHICLE DIFFERENTIAL

INCORPORATION BY REFERENCE

The disclosure of Japanese Patent Application No. 2015-157740 filed on Aug. 7, 2015 including the specification, drawings and abstract is incorporated herein by reference in its entirety.

BACKGROUND

1. Technical Field

The present disclosure relates to a vehicle differential including a differential case with an opening, and more particularly to a technique for suppressing gear noise generated from a differential case.

2. Description of Related Art

Among known types of vehicle differentials is one that has a differential case and a ring gear, of which the differential case is configured to rotate around one rotational axis, and has a peripheral wall housing a pair of side gears and pinion gears in mesh therewith, an annular ring gear mount protruding from the peripheral wall toward the outer peripheral side to allow the ring gear to be fixed thereto, and an opening formed so as to penetrate a part of the peripheral wall, and the ring gear is fitted on the outer side of the peripheral wall and has an annular shape centered at the rotational axis. One example is the vehicle differential of Japanese Patent Application Publication No. 2011-106504 (JP 2011-106504 A). The vehicle differential of JP 2011-106504 A transmits power, input into the annular ring gear fixed to the mount face of the annular ring gear mount, to a pair of left and right drive wheels that are respectively coupled to the pair of side gears, while allowing a rotational difference between the pair of side gears.

SUMMARY

Since a part of the peripheral wall of the differential case is open in the vehicle differential disclosed in JP 2011-106504 A, the part of the peripheral wall around the opening is susceptible to stress, and the flanks of the ring gear in the part of the ring gear mounted around the opening are also susceptible to stress. Accordingly, when a high torque is input into the ring gear, the flanks of the ring gear in the part of the ring gear mounted around the opening in the assembly of the differential case and the ring gear are more likely to deform than other parts of the ring gear. Thus, the area of contact between the ring gear and a driving gear that inputs torque into the ring gear may vary locally, and such a variation in contact area may result in increased gear noise.

The present disclosure provides a vehicle differential that suppresses gear noise resulting from a variation in area of contact between the ring gear and the driving gear.

A vehicle differential according to one aspect of the present disclosure includes a pair of side gears, a pinion gear, a differential case, and an annular ring gear. The pinion gear meshes with the side gears. The differential case has a peripheral wall that houses the side gears and the pinion gear. The differential case includes an opening penetrating the differential case at a part of the peripheral wall. The differential case is configured to rotate around a rotational axis. The annular ring gear is attached to an outer side of the peripheral wall of the differential case such that a central axis of the ring gear and the rotational axis coincide with each other. The annular ring gear includes a protrusion on an inner peripheral edge of the annular ring gear. The protrusion covers a part of the opening when viewed in a penetration direction of the opening. The protrusion protrudes toward an inner side of the opening in a radial direction of the rotational axis as compared with an other part of the inner peripheral edge of the ring gear that has no protrusion.

According to the vehicle differential of the above aspect, a width of the part of the ring gear in the radial direction of the rotational axis within the angular range of the opening around the rotational axis is increased and thereby the rigidity of the ring gear is enhanced, so that gear noise due to a variation in area of contact between the ring gear and the driving gear is suppressed. On the other hand, since the protrusion of the ring gear protrudes toward the opening of the differential case, the protrusion does not add to the size of the assembly of the differential case and the ring gear. Thus, it is possible to enhance the rigidity of the assembly of the ring gear and the differential case and at the same time downsize the entire differential.

In the vehicle differential according to the above aspect, a facewidth of the ring gear in the radial direction of the rotational axis may be larger in the part having the protrusion than in the other part that has no protrusion. According to this aspect, even when the position of contact between the ring gear and the driving pinion shifts toward the protrusion of the ring gear, the driving pinion meshes with the meshing teeth of an increased facewidth in the part with the protrusion of the ring gear, so that a decrease in area of contact between the ring gear and the driving pinion is prevented and the generation of gear noise is reduced. Moreover, the durability of the ring gear can be enhanced, since an increase in input per unit area into the meshing teeth of the ring gear due to a decrease in area of contact with the driving pinion is prevented.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

In the following, embodiments of a vehicle differential of the present disclosure will be described in detail with reference to the drawings.

Figure 1:
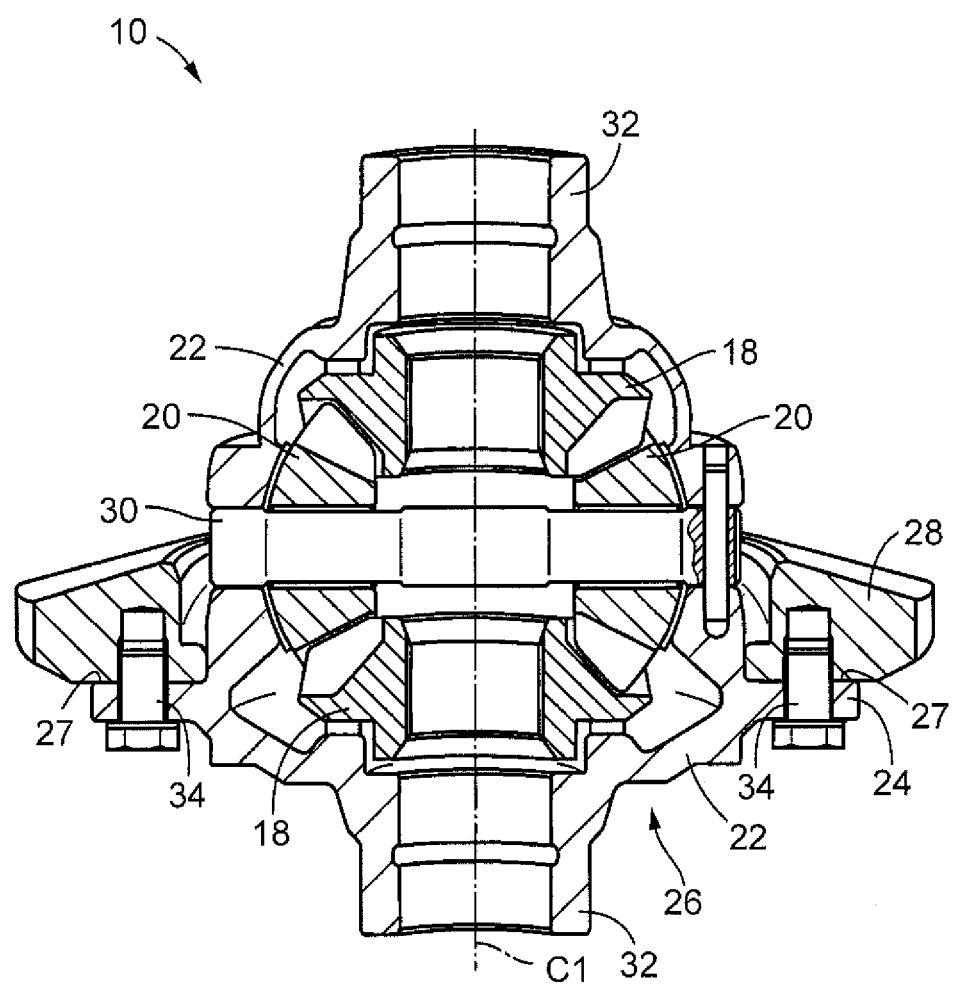
FIG. 1 is a perspective view showing a section including a rotational axis of a vehicle differential of one embodiment.
Figure 2:
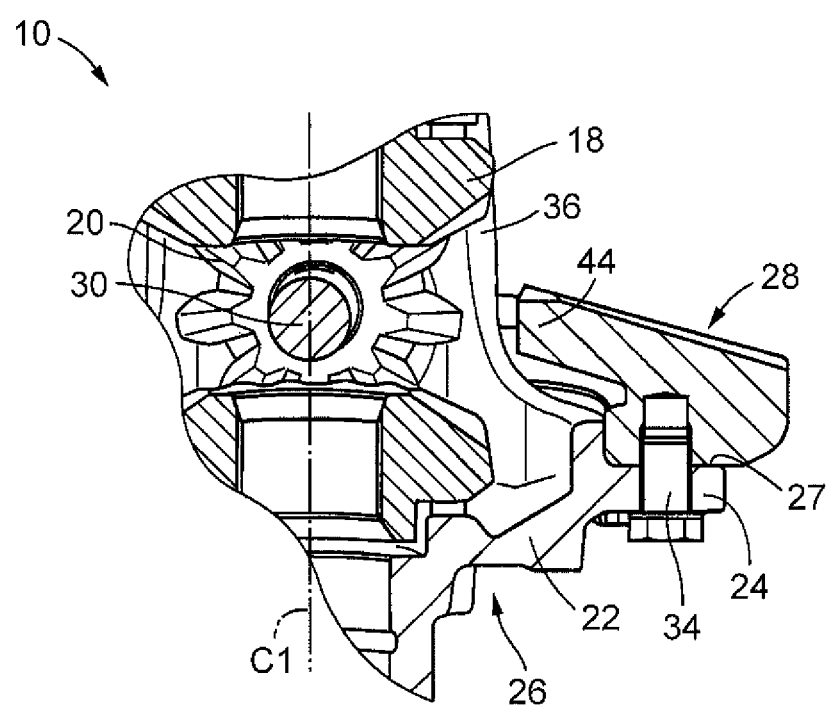
FIG. 2 is a perspective view showing a part of a section that includes the rotational axis of the vehicle differential of FIG. 1 and is perpendicular to the centerline of a pinion pin.
Figure 3:
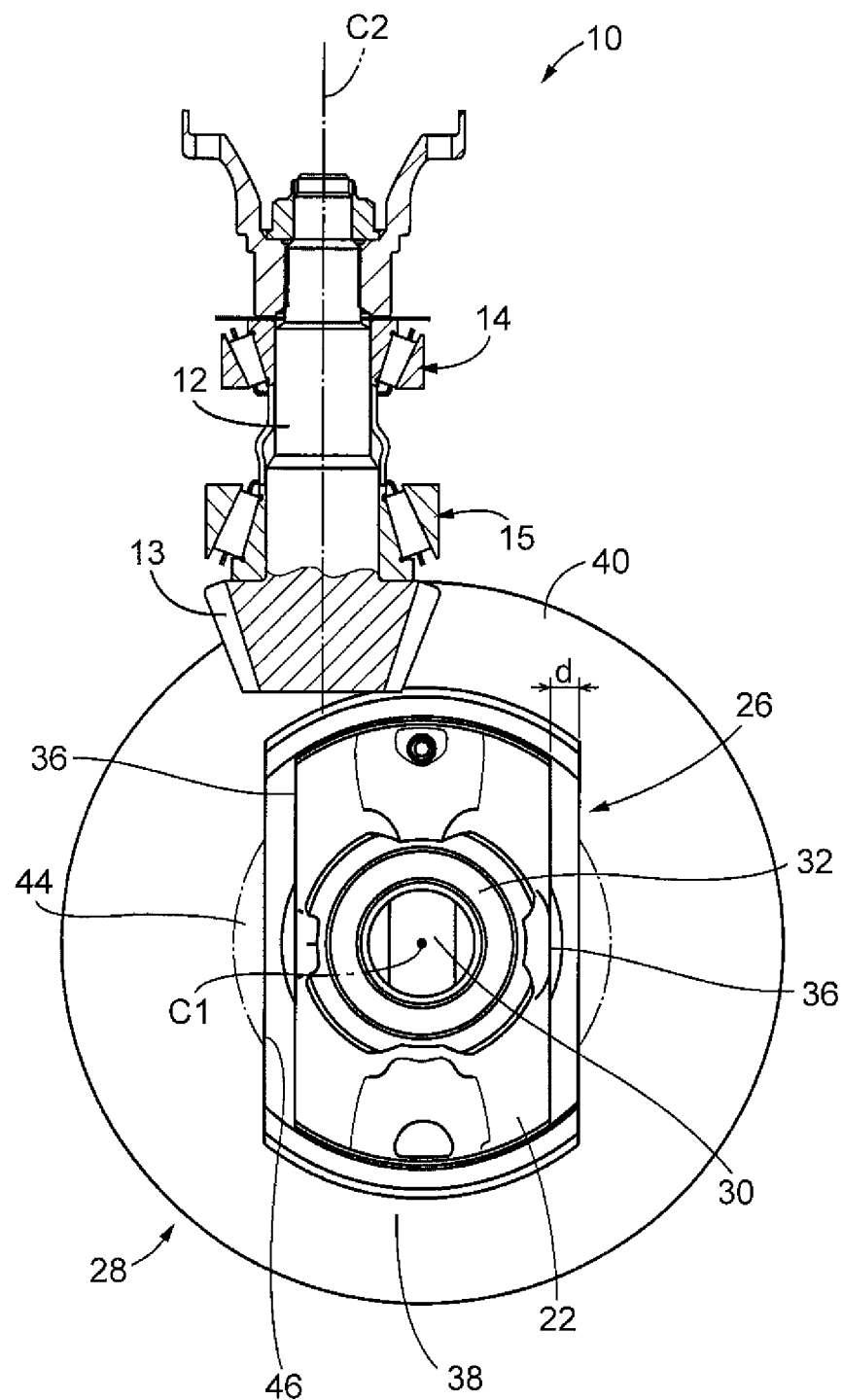
FIG. 3 is a front view of the vehicle differential of FIG. 1 as seen in the direction of the rotational axis.
Figure 4:
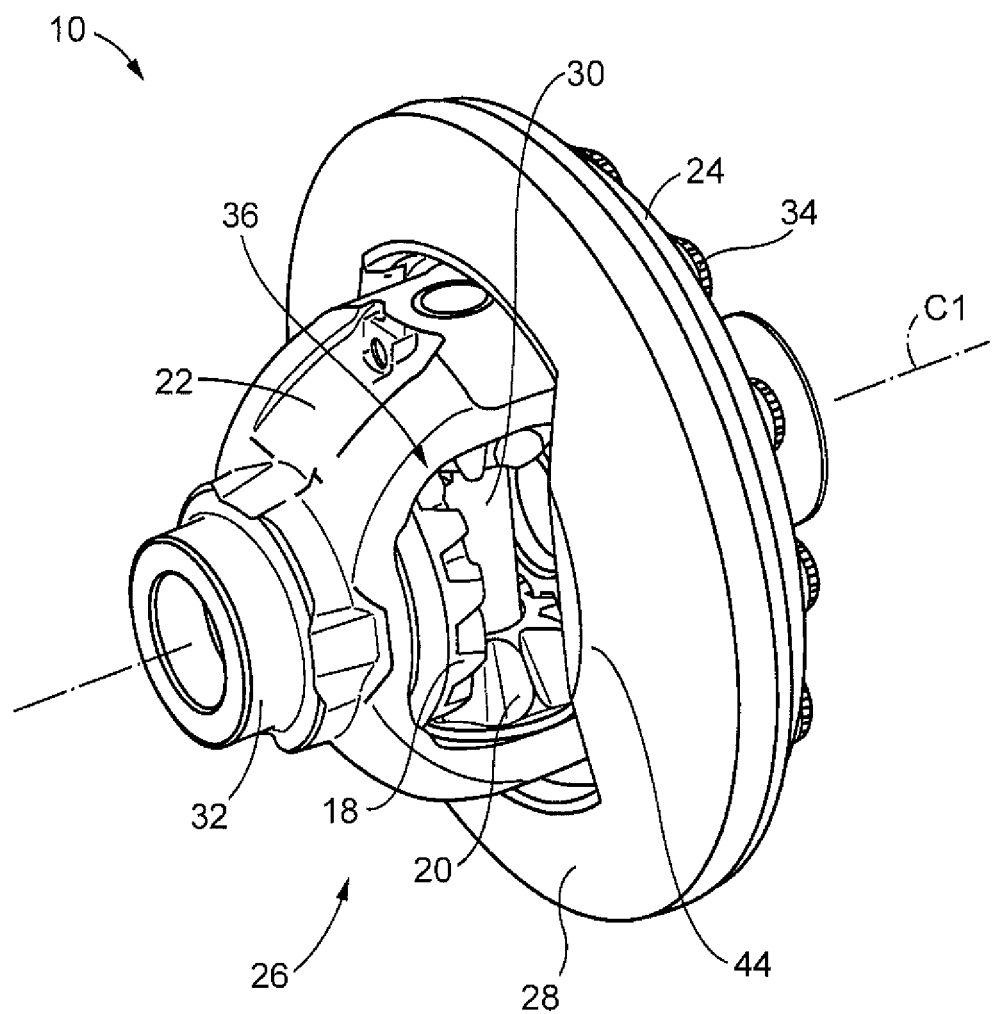
FIG. 4 is a perspective view of the vehicle differential of FIG. 1.

FIG. 1 is a perspective view showing a vehicle differential 10 (hereinafter referred to as the "differential 10") of one embodiment, in a section passing through a rotational axis C1 of a differential case 26 and the centerline of a pinion pin 30. FIG. 2 is a perspective view showing a part of a section that passes through the rotational axis C1 of the differential case 26 of the differential 10 and is perpendicular to the centerline of the pinion pin 30. FIG. 3 is a view of the differential 10 as seen in the direction of the rotational axis C1, including a view showing a section of a driving pinion 13 in mesh with a ring gear 28 and a driving pinion shaft 12. FIG. 4 is a perspective view of the differential 10. Meshing teeth 16 (shown in FIG. 6 and FIG. 7) formed in the ring gear 28, which is a hypoid gear, for example, are omitted in FIG. 1 to FIG. 4. In FIG. 1 and FIG. 2, axles that are coupled to side gears 18 such that power can be transmitted thereto are not shown. The differential 10 includes the differential case 26 and the annular ring gear 28. The differential case 26 is configured to rotate around rotational axis C1 and has: a cylindrical peripheral wall 22 that houses the pair of side gears 18 facing each other on the rotational axis C1, and a pair of pinion gears 20 facing each other across the rotational axis C1 and in mesh respectively with the pair of side gears 18, such that each of the side gears 18 and the pinion gears 20 is rotatably supported; and an annular flange 24 that is integrally provided on the peripheral wall 22 so as to protrude from the outer peripheral surface of the peripheral wall 22 toward the outer peripheral side in a direction orthogonal to the rotational axis C1, and functions as a ring gear mount. The ring gear 28 is fixed to an annular mount face 27 that is one face of the flange 24. That is, the ring gear 28 is fitted on the outer side of the peripheral wall 22 such that the central axis of the ring gear 28 coincides with the rotational axis C1 of the differential case 26. Both ends of the pinion pin 30 that rotatably supports the pair of pinion gears 20 inside the differential case 26 are fixed at the middle of the peripheral wall 22 in the direction of the rotational axis C1 such that the longitudinal direction of the pinion pin 30 is orthogonal to the rotational axis C1 of the ring gear 28. The differential case 26 further includes a pair of cylindrical bosses 32 that protrude from the peripheral wall 22 in directions away from each other along the direction of the rotational axis C1. One end of each axle of the pair of axles (not shown) is respectively inserted into the bosses 32, and respectively coupled by spline fitting to the pair of side gears 18, which are provided across the pair of pinion gears 20 inside the differential case 26, such that power can be transmitted to the axles. The flange 24 protrudes toward the outer peripheral side from the outer peripheral surface of the peripheral wall 22 of the differential case 26 between the pinion pin 30 and the boss 32 in the direction of the rotational axis C1. The ring gear 28, in surface contact with the annular mount face 27 of the flange 24 on the side of the pinion pin 30, is fixed to the flange 24 with a plurality of (for example, 16) bolts 34 disposed at regular intervals in the circumferential direction.

As shown in FIG. 2 to FIG. 4, the differential case 26 has a pair of openings 36 each penetrating the differential case 26 at a part of the side surface of the peripheral wall 22. The pair of openings 36 are formed so as to locally cut out the side surface of the cylindrical peripheral wall 22 across the pinion pin 30.

As shown in FIG. 3, the differential 10 is provided, for example, on a power transmission path through which power from a vehicle driving source is transmitted to a pair of drive wheels, and includes the driving pinion shaft 12 coupled to a propeller shaft and the driving pinion 13 provided at one end of the driving pinion shaft 12. The driving pinion shaft 12 is supported through a first bearing 14 and a second bearing 15 on a housing (not shown) so as to be rotatable around a rotational axis C2. The rotational axis C2 of the driving pinion shaft 12 is in a relation of three-dimensional intersection with the ring gear 28 in which the rotational axis C2 is at a right angle to but does not intersect with the rotational axis C1 of the ring gear 28, and the driving pinion 13 and the ring gear 28 in mesh therewith constitute a hypoid gear pair. The differential 10 transmits power, input from the driving pinion 13 into the ring gear 28, to the pair of left and right axles that are respectively coupled to the pair of side gears 18, while allowing a rotational difference between the pair of side gears 18.

Figure 5:
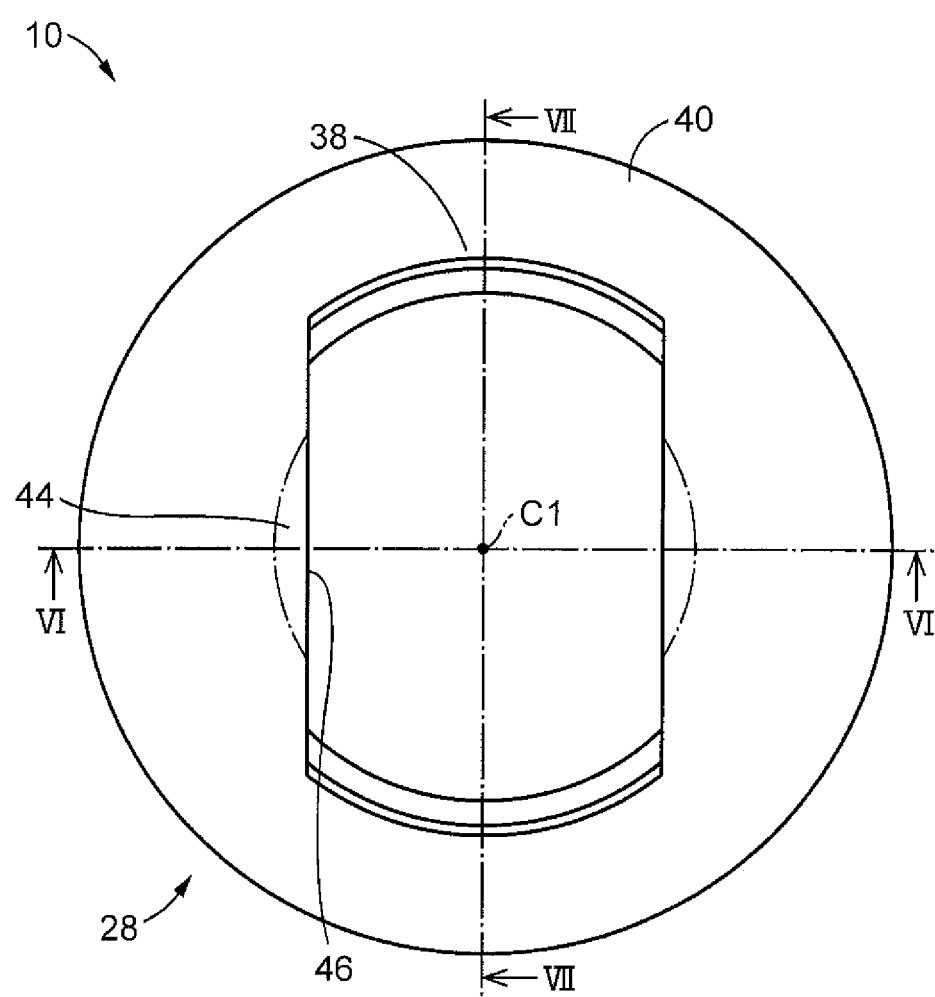
FIG. 5 is a front view of the ring gear of FIG. 1 as seen in the direction of the rotational axis.
Figure 6:
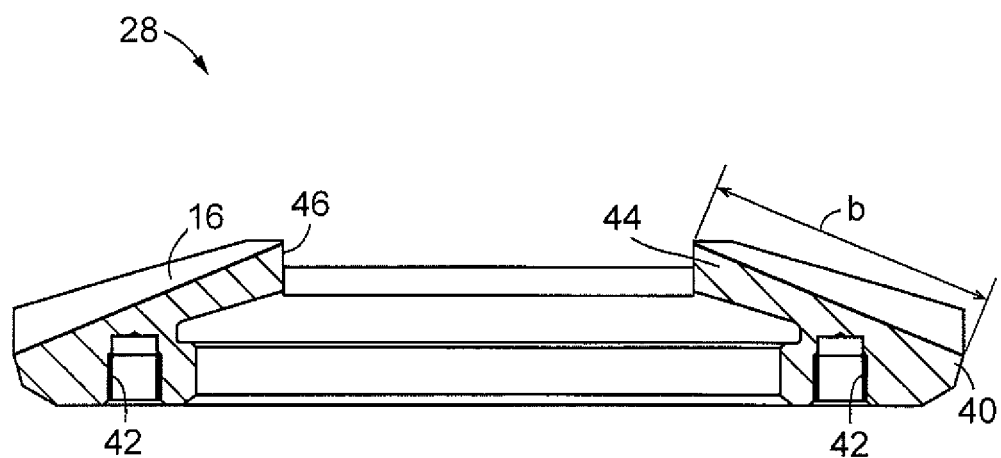
FIG. 6 is a view of the ring gear of FIG. 5 in section VI-VI.
Figure 7:
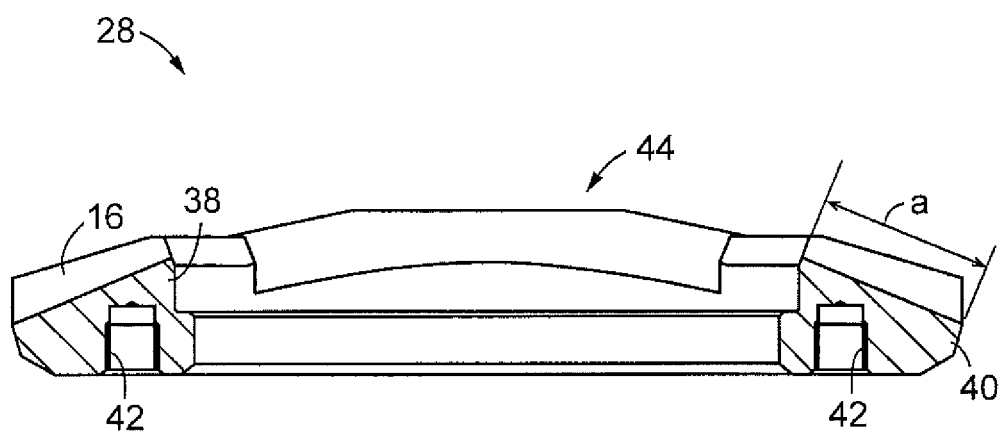
FIG. 7 is a view of the ring gear of FIG. 5 in section VII-VII.

FIG. 5 is a view of the ring gear 28 as seen in the direction of the rotational axis C1; FIG. 6 is a view of section VI-VI of FIG. 5; and FIG. 7 is a view of section VII-VII of FIG. 5. As shown in FIG. 7, when seen in the direction of the rotational axis C1, the annular ring gear 28 has the plurality of meshing teeth 16 of a facewidth a on the conical surface between an inner peripheral edge 38 and an outer peripheral edge 40 on the opposite side from the side of the ring gear 28 in contact with the mount face 27 of the flange 24, and the meshing teeth 16 are in mesh with the meshing teeth of the driving pinion 13 having a smaller diameter than the ring gear 28. In the face of the ring gear 28 in contact with the flange 24, a plurality of columnar holes 42 with a female thread engaging with the bolt 34 are formed in the circumferential direction. In FIG. 5, the meshing teeth 16 formed on the conical surface of the ring gear 28 are omitted. Alternatively, the differential case 26 and the ring gear 28 may be assembled by welding instead of with bolts.

Since the differential case 26 has the pair of openings 36 in the peripheral wall 22, the parts of the peripheral wall 22 around the openings 36 are susceptible to stress, and the flanks of the parts of the ring gear 28 around the openings 36 are also susceptible to stress. Accordingly, when a large load is input into the ring gear 28, deflection becomes largest in the meshing teeth 16 formed in the parts of the ring gear 28, which is fixed to the flange 24, within the angular ranges of the openings 36 around the rotational axis C1, i.e., the meshing teeth 16 formed in the vicinity of the openings 36, which may result in a local variation in area of contact between the ring gear 28 and the driving pinion 13. Thus, it has been desired to downsize the differential 10 and at the same time suppress the gear noise resulting from a variation in area of contact between the ring gear 28 and the driving pinion 13 in the assembly which includes the differential case 26 and the ring gear 28.

As also shown in FIG. 6, the parts of the inner peripheral edge 38 of the ring gear 28 facing the openings 36 in the radial direction, i.e., the parts of the ring gear 28 within the angular ranges of the openings 36 of the peripheral wall 22 around the rotational axis C1, each have an inner peripheral protrusion 44 that protrudes toward the inner side of the opening 36 of the peripheral wall 22 in the radial direction of the rotational axis C1 as compared with the other parts of the inner peripheral edge 38 outside the angular ranges of the openings 36 around the rotational axis C1. The inner peripheral protrusion 44 covers a part of the opening 36 when seen in the direction in which the opening 36 penetrates the peripheral wall 22, and is formed so as to protrude toward the inner side of the opening 36 in the radial direction of the rotational axis C1 as compared with the other parts of the inner peripheral edge 38 that are outside the angular ranges of the openings 36 around the rotational axis C1 and do not cover a part of the openings 36. The parts of the inner peripheral edge 38 of the ring gear 28 within the angular ranges of the openings 36 of the peripheral wall 22 around the rotational axis C1 include a part of the ring gear 28 that overlaps the opening 36 of the peripheral wall 22 when seen in a direction perpendicular to the rotational axis C1 of the ring gear 28 and perpendicular to the centerline of the pinion pin 30. As shown in FIG. 3, inner peripheral end faces 46 of the pair of inner peripheral protrusions 44 are provided at a predetermined distance d respectively to the pair of openings 36 of the differential case 26. As shown in FIG. 6, meshing teeth 16 similar to those on the conical surface of the parts of the ring gear 28 outside the angular ranges around the rotational axis C1 of the openings 36 formed in the peripheral wall 22 are formed on the conical surface of the parts of the ring gear 28 where the inner peripheral protrusions 44 are formed within the angular ranges around the rotational axis C1 of the openings 36 formed in the peripheral wall 22, and the facewidth of these meshing teeth 16 in the radial direction of the rotational axis C1 is increased from the facewidth a to a maximum facewidth b.

Figure 8:
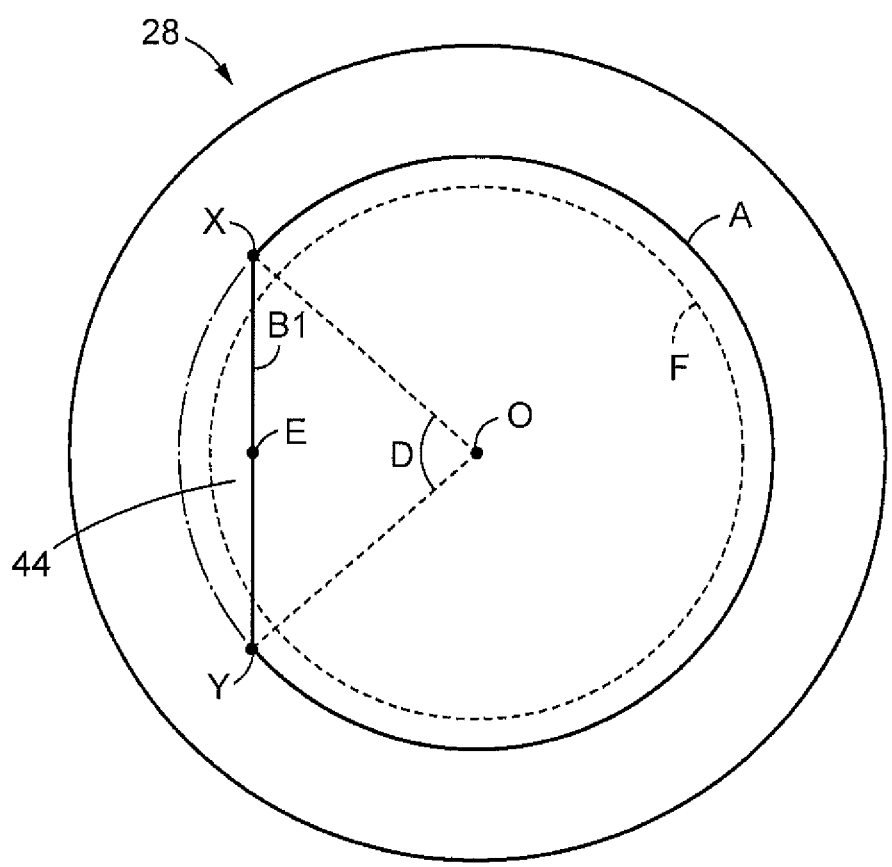
FIG. 8 is a view showing a projection of the ring gear of FIG. 5 onto a plane perpendicular to the direction of the rotational axis.

FIG. 8 is a view showing an example of a projection of the ring gear 28 onto a plane perpendicular to the rotational axis C1 thereof, and illustrates the shape of the inner peripheral end face 46 of the inner peripheral protrusion 44. The inner peripheral protrusion 44 is formed by protruding the part of the inner peripheral edge 38, within the angular range of the opening 36 of the differential case 26 around the rotational axis C1, toward the inner side of the opening 36 in the radial direction of the rotational axis C1 such that an angle D formed by two lines respectively connecting a point X and a point Y, at which a line B1 that is a projection of the inner peripheral end face 46 intersects with a circle A that is a projection of the inner peripheral edge of the meshing teeth 16 of the facewidth a formed on the conical surface of the parts of the ring gear 28 outside the angular ranges around the rotational axis C1 of the openings 36 formed in the peripheral wall 22, with a point O indicating the center of the circle A, i.e., the rotational axis C1, is 10 degrees or larger, and such that a point E on the line B1 at which the distance to the point O is minimum is preferably located inside a circle F indicated by the dashed line that has a radius of 97% of the radius of the circle A and is concentric with the circle A. The point E is a point of intersection between the line B1 and a line that passes through the point O and is orthogonal to the line XY. With the inner peripheral protrusions 44 thus formed, the width in the radial direction of the ring gear 28 within the angular ranges around the rotational axis C1 of the openings 36 of the peripheral wall 22 of the differential case 26 is increased, so that the rigidity of the assembly of the ring gear 28 and the differential case 26 can be sufficiently enhanced. Although actually the inner peripheral end faces 46 of the inner peripheral protrusions 44 are projected as a pair of lines B1 at positions symmetrical to each other with respect to the point O, one protrusion of the pair is omitted in FIG. 8.

As has been described above, according to the differential 10 of this embodiment, the inner peripheral edge 38 of the ring gear 28 has the inner peripheral protrusions 44 that cover a part of the openings 36 when seen in the penetration direction of the openings 36, and protrude toward the inner side of the openings 36 in the radial direction of the rotational axis C1 as compared with the other parts of the inner peripheral edge 38 that do not cover a part of the openings 36. In the assembly of the ring gear 28 with such inner peripheral protrusions 44 and the differential case 26, the width of the ring gear 28 in the radial direction of the rotational axis C1 is increased by the inner peripheral protrusions 44 that cover a part of the openings 36 within the angular ranges of the openings 36 around the rotational axis C1, and thereby the rigidity of the ring gear 28 is enhanced, so that gear noise due to a variation in area of contact between the ring gear 28 and the driving pinion 13 is suppressed. On the other hand, since the inner peripheral protrusions 44 of the ring gear 28 protrude toward the openings 36 of the differential case 26, the inner peripheral protrusions 44 do not add to the size of the assembly which includes the differential case 26 and the ring gear 28. Thus, it is possible to enhance the rigidity of the assembly of the ring gear 28 and the differential case 26 and at the same time downsize the entire differential 10.

According to the differential 10 of this embodiment, the facewidth b in the radial direction of the rotational axis C1 of the meshing teeth 16 on the conical surface of the parts of the ring gear 28 where the inner peripheral protrusions 44 are formed within the angular ranges of the openings 36 of the differential case 26 around the rotational axis C1 is larger than the facewidth a of the meshing teeth 16 formed on the conical surface of the other parts of the ring gear 28 outside the angular ranges of the openings 36 of the differential case 26 around the rotational axis C1. Therefore, even when the position of contact between the ring gear 28 and the driving pinion 13 shifts toward the inner peripheral protrusion 44, the driving pinion 13 meshes with the meshing teeth 16 of the increased facewidth b in the inner peripheral protrusion 44 of the ring gear 28, so that a decrease in area of contact between the ring gear 28 and the driving pinion 13 is prevented and the generation of gear noise is reduced. Moreover, the durability of the ring gear 28 can be enhanced, since an increase in input per unit area into the meshing teeth 16 due to a decrease in area of contact between the ring gear 28 and the driving pinion 13 is prevented.

Next, other embodiments will be described. In the following embodiments, those parts that are substantially the same in function as in the above embodiment will be given the same reference signs and detailed description thereof will be omitted.

Figure 9:
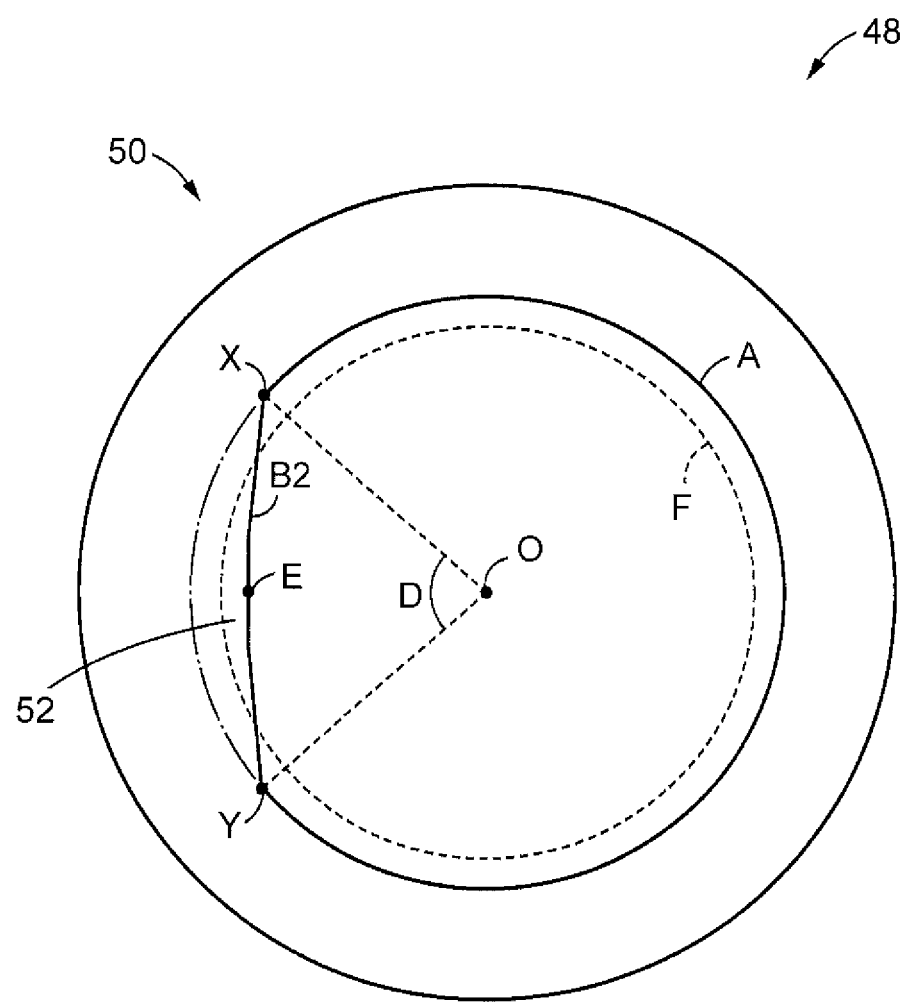
FIG. 9 is a view showing a projection of a ring gear of a vehicle differential of another embodiment onto a plane perpendicular to the direction of the rotational axis.

A differential 48 of another embodiment is the same as the differential 10 of the above embodiment except that the shape of an inner peripheral protrusion 52 of a ring gear 50 is different from that of the ring gear 28. This difference will be described below using FIG. 9. FIG. 9 is a view corresponding to FIG. 8 and shows a projection of the ring gear 50 onto a plane perpendicular to the rotational axis C1 thereof. The inner peripheral protrusion 52 is formed by protruding the part of the inner peripheral edge 38, within the angular range around the rotational axis C1 of each of the pair of openings 36 of the differential case 26, toward the inner side of the opening 36 in the radial direction of the rotational axis C1 such that the angle D formed by two lines respectively connecting the point X and the point Y, at which a bent line B2 that is a projection of the inner peripheral edge of the meshing teeth 16 of the facewidth b formed on the conical surface of the inner peripheral protrusion 52 intersects with the circle A, with the point O is 10 degrees or larger, and such that the point E on the bent line B2 at which the distance to the point O is minimum is located inside the circle F. The point E in this embodiment is a point of intersection between the bent line B2 and a line that passes through the point O and is orthogonal to the line XY. The bent line B2 is symmetrical with respect to that line that passes through the point O and is orthogonal to the line XY. According to the differential 48 of this embodiment, the same effects as in the first embodiment can be achieved.

Figure 10:
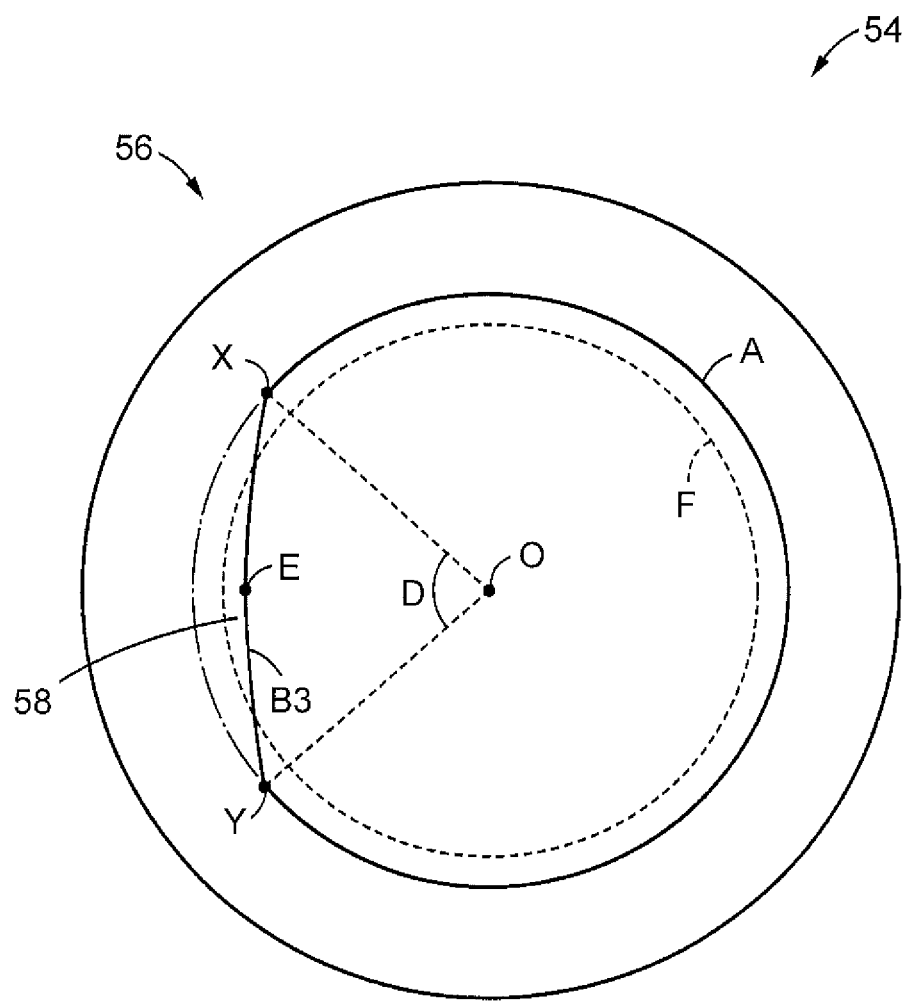
FIG. 10 is a view showing a projection of a ring gear of a vehicle differential of another embodiment onto a plane perpendicular to the direction of the rotational axis.

FIG. 10 is a view corresponding to FIG. 8 and shows a projection of a ring gear 56 of a differential 54 of another embodiment onto a plane perpendicular to the rotational axis C1 thereof. An inner peripheral protrusion 58 of the ring gear 56 is formed by protruding the part of the inner peripheral edge 38, within the angular range around the rotational axis C1 of each of the pair of openings 36 of the differential case 26, toward the inner side of the opening 36 in the radial direction of the rotational axis C1 such that the angle D formed by two lines respectively connecting the point X and the point Y, at which a smooth arc B3 that is a projection of the inner peripheral edge of the meshing teeth 16 of the facewidth b formed on the conical surface of the inner peripheral protrusion 58 intersects with the circle A, with the point O is 10 degrees or larger, and such that the point E on the arc B3 at which the distance to the point O is minimum is located inside the circle F. The point E in this embodiment is a point of intersection between the arc B3 and a line that passes through the point O and is orthogonal to the line XY. The arc B3 is symmetrical with respect to that line that passes through the point O and is orthogonal to the line XY. According to the differential 54 of this embodiment, the same effects as in the first embodiment can be achieved.

Figure 11:
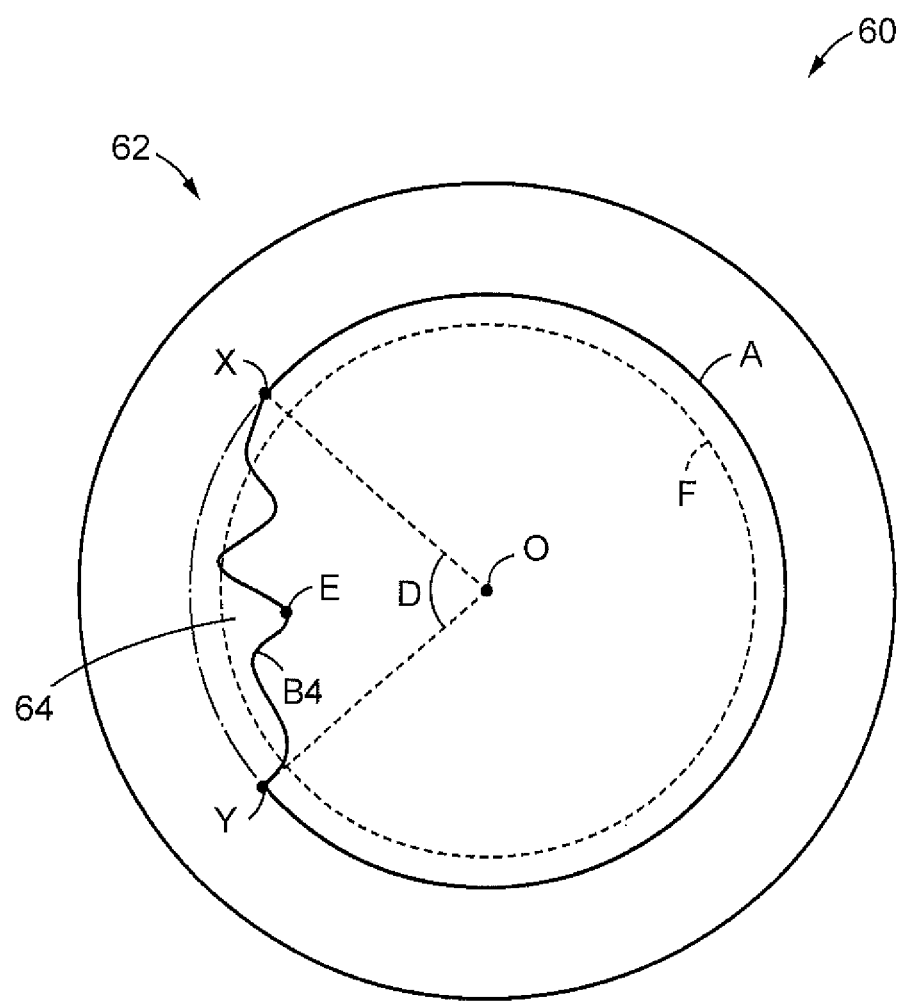
FIG. 11 is a view showing a projection of a ring gear of a vehicle differential of another embodiment onto a plane perpendicular to the direction of the rotational axis.

FIG. 11 is a view corresponding to FIG. 8 and shows a projection of a ring gear 62 of a differential 60 of another embodiment onto a plane perpendicular to the rotational axis C1 thereof. An inner peripheral protrusion 64 of the ring gear 62 is formed by protruding the part of the inner peripheral edge 38, within the angular range around the rotational axis C1 of each of the pair of openings 36 of the differential case 26, toward the inner side of the opening 36 in the radial direction of the rotational axis C1 such that the angle D formed by two lines respectively connecting the point X and the point Y, at which a curved line B4 that is a projection of the inner peripheral edge of the meshing teeth 16 of the facewidth b formed on the conical surface of the inner peripheral protrusion 64 intersects with the circle A, with the point O is 10 degrees or larger, and such that the point E on the curved line B4 at which the distance to the point O is minimum is located inside the circle F. According to the differential 60 of this embodiment, the same effects as in the first embodiment can be achieved.

While the present disclosure has been made with reference to the drawings, the disclosure according to other aspects can also be implemented, and various modifications can be made within the scope of the disclosure.

For example, according to the differential 10 of the above embodiment, the pair of openings 36 are provided across the pinion pin 30 in the peripheral wall 22 of the differential case 26. However, the present disclosure is not limited to this example. For example, one opening or more than two openings 36 may be formed in the peripheral wall 22, and to enhance the rigidity of the assembly of the ring gear 28 and the differential case 26, the ring gear 28 may be provided with the inner peripheral protrusion 44 that is formed by protruding the part of the inner peripheral edge 38 of the ring gear 28 around the opening 36, within the angular range of the opening 36 around the rotational axis C1, toward the inner side of the one or more than two openings 36 in the radial direction of the rotational axis C1 as compared with the other part of the inner peripheral edge 38 outside the angular range of the opening 36 around the rotational axis C1.

According to the differential 10 of the above embodiment, the facewidth b of the meshing teeth 16 on the conical surface of the parts of the ring gear 28 where the inner peripheral protrusions 44 are formed within the angular ranges of the openings 36 of the differential case 26 around the rotational axis C1 is larger than the facewidth a of the meshing teeth 16 on the conical surface of the other parts of the ring gear 28 outside the angular ranges of the openings 36 of the differential case 26 around the rotational axis C1. However, the present disclosure is not limited to this example. For example, without the meshing teeth 16 formed on the conical surface of the parts, where the inner peripheral protrusions 44 are formed, being increased in facewidth to the maximum facewidth b from the facewidth a that is the same as the facewidth of the meshing teeth 16 on the conical surface of the other parts of the ring gear 28 outside the angular ranges of the openings 36 of the differential case 26 around the rotational axis C1, meshing teeth 16 having an incomplete shape, instead of the complete meshing teeth 16, may be formed in the inner peripheral protrusions 44, or alternatively the inner peripheral protrusions 44 may have no meshing teeth at all. Even if the meshing teeth 16 are not formed in the inner peripheral protrusions 44, the rigidity of the assembly of the ring gear 28 and the differential case 26 is enhanced.

According to the differential 10 of the above embodiment, there is the predetermined distance d between the openings 36 of the differential case 26 and the inner peripheral end faces 46 of the inner peripheral protrusions 44 of the ring gear 28 facing the openings 36. However, the present disclosure is not limited to this example. For example, the distance d between the openings 36 of the differential case 26 and the inner peripheral end faces 46 of the inner peripheral protrusions 44 may be narrowed to such an extent that the ring gear 28 is almost unable to rotate relative to the differential case 26 while the differential case 26 and the ring gear 28 are being assembled with the bolts 34. Thus, the ring gear 28 is positioned in the circumferential direction relative to the differential case 26, and the ring gear 28 is prevented from rotating relative to the differential case 26 while being assembled, which makes it easier to assemble the differential case 26 and the ring gear 28 with the bolts 34.

According to the differential 10 of the above embodiment, the differential case 26 and the ring gear 28 are assembled with the bolts 34, but instead the differential case 26 and the ring gear 28 may be assembled by welding. Thus, the ring gear 28 is not positioned with bolts relative to the differential case 26, which makes it easier to assemble the differential case 26 and the ring gear 28.

In the above embodiments, the inner peripheral protrusion 44, the inner peripheral protrusion 52, the inner peripheral protrusion 58, and the inner peripheral protrusion 64 protrude to the inside of the circle F having a radius of 97% of the radius of the circle A that is a projection of the inner peripheral edge of the meshing teeth 16 of the facewidth a. However, it is not absolutely necessary that the inner peripheral protrusion protrudes to the inside of the circle F, and the rigidity enhancing effect according to the amount of protrusion can be achieved.

The embodiments described above are merely examples, and although not described herein, the present disclosure can also be implemented with various modifications and improvements made thereto by those skilled in the art on the basis of their knowledge within the scope of the disclosure.

What is claimed is:

1. A vehicle differential comprising:
   a pair of side gears;
   a pinion gear meshing with the side gears;
   a differential case that has a peripheral wall housing the side gears and the pinion gear, the differential case including an opening penetrating the differential case at a part of the peripheral wall, the differential case configured to rotate around a rotational axis; and
   an annular ring gear attached to an outer side of the peripheral wall of the differential case such that a central axis of the annular ring gear and the rotational axis coincide with each other, the annular ring gear including a protrusion on an inner peripheral edge of the annular ring gear, the protrusion covering a part of the opening when viewed in a penetration direction of the opening, the protrusion protruding toward an inner side of the opening in a radial direction of the rotational axis as compared with an other part of the inner peripheral edge of the annular ring gear that has no protrusion.

2. The vehicle differential according to claim 1, wherein a facewidth of the annular ring gear in the radial direction of the rotational axis is larger in the part having the protrusion than in the other part that has no protrusion.

3. The vehicle differential according to claim 1, wherein an inner edge of the protrusion is a straight surface.

4. The vehicle differential according to claim 1, wherein an inner edge of the protrusion is defined by two straight surfaces.

5. The vehicle differential according to claim 1, wherein an inner edge of the protrusion is a curved surface.

* * * * *